(12) United States Patent
Beirne et al.

(10) Patent No.: US 7,546,266 B2
(45) Date of Patent: Jun. 9, 2009

(54) METHOD, SYSTEM, AND STORAGE MEDIUM FOR PRE-SCREENING CUSTOMERS FOR CREDIT CARD APPROVAL AT A POINT OF SALE

(75) Inventors: Kenneth Beirne, Bronx, NY (US); Guy Serra, Newtown, CT (US); Stefano Rocchi, Fayetteville, AR (US); Syed Kirmani, Norwalk, CT (US)

(73) Assignee: General Electric Company, Schenectady, NY (US)

( * ) Notice: Subject to any disclaimer, the term of this patent is extended or adjusted under 35 U.S.C. 154(b) by 1644 days.

(21) Appl. No.: 09/682,787

(22) Filed: Oct. 18, 2001

(65) Prior Publication Data
US 2003/0078877 A1    Apr. 24, 2003

(51) Int. Cl.
*G06Q 40/00* (2006.01)
(52) U.S. Cl. .......................... 705/37; 705/39
(58) Field of Classification Search ............. 705/27, 705/35–39
See application file for complete search history.

(56) References Cited

U.S. PATENT DOCUMENTS

| | | | |
|---|---|---|---|
| 5,239,462 A | | 8/1993 | Jones et al. |
| 5,426,281 A | * | 6/1995 | Abecassis .................. 235/379 |
| 5,434,394 A | * | 7/1995 | Roach et al. ................ 235/375 |
| 5,500,890 A | * | 3/1996 | Rogge et al. ............. 379/91.02 |
| 5,797,133 A | | 8/1998 | Jones et al. |
| 5,960,411 A | | 9/1999 | Hartman et al. |
| 5,991,750 A | * | 11/1999 | Watson ......................... 705/44 |
| 6,014,636 A | * | 1/2000 | Reeder ......................... 705/17 |
| 6,144,948 A | | 11/2000 | Walker et al. |
| 6,167,383 A | | 12/2000 | Henson |

(Continued)

OTHER PUBLICATIONS

Tedeschi, The Plain Dealer, Oct. 2000, "Online Credit A Lure to Strapped Buyers Card Tapped Out? Net has Fresh Way To Say, Charge It", (the "Online Credit Article") 3pgs.

(Continued)

*Primary Examiner*—Thu Thao Havan
(74) *Attorney, Agent, or Firm*—Buckley, Maschoff & Talwalkar LLC

(57) ABSTRACT

An exemplary embodiment of the invention relates to a method, system and storage medium for pre-screening customers for a credit card at a point of sale. The method includes receiving the customer data at a point of sale system and, during a check out process: transmitting the customer data to a server; searching a database for the customer data; and based upon results of the searching, performing a credit worthiness check and providing said customer with an invitation to open a charge account. If the customer accepts the invitation, a charge account is opened before a payment method is selected whereby the customer can place the items selected for purchase on the new charge account while at the point of sale system. The system includes at least one point of sale system coupled to a communications link; a server coupled to the point of sale system via the communications link; a data storage device in communication with the server; and a link to a credit information server.

30 Claims, 2 Drawing Sheets

U.S. PATENT DOCUMENTS

| | | |
|---|---|---|
| 6,233,565 B1 * | 5/2001 | Lewis et al. .................... 705/35 |
| 6,256,614 B1 | 7/2001 | Wecker et al. |
| 6,324,524 B1 * | 11/2001 | Lent et al. ..................... 705/38 |
| 6,336,104 B1 * | 1/2002 | Walker et al. ................. 705/38 |
| 6,354,498 B1 * | 3/2002 | Lutz .......................... 235/385 |
| 6,381,510 B1 | 4/2002 | Amidhozour et al. |
| 6,405,181 B2 | 6/2002 | Lent et al. |
| 6,418,436 B1 | 7/2002 | Degen et al. |
| 6,567,791 B2 * | 5/2003 | Lent et al. ..................... 705/38 |
| 2003/0036995 A1 | 2/2003 | Lazerson |
| 2003/0195848 A1 | 10/2003 | Felger |

OTHER PUBLICATIONS

No Author, "Truth in Lending act" [Retrieved Jul. 29, 2004]. Retrieved from Internet: URL: http://www.smartagreements.com/bltopics/Bltopi4l.html 3pgs.

No Author, "Wells Fargo Launches First Real-Time, Online Home Equity Credit Decision-Making Service", Business Wire, Jun. 3, 1998 [Retrieved Jul. 26, 2004]. Retrieved from Internet: URL: http://proquest.uni.com.

PTO, Non-Final Office Action dated Aug. 16, 2004 for U.S. Appl. No. 09/677,234.

Response to Non-Final Office Action filed Sep. 13, 2004.

* cited by examiner

US 7,546,266 B2

METHOD, SYSTEM, AND STORAGE MEDIUM FOR PRE-SCREENING CUSTOMERS FOR CREDIT CARD APPROVAL AT A POINT OF SALE

BACKGROUND OF INVENTION

The present invention generally relates to electronic commerce systems and, more specifically, to a method, system, and storage medium for pre-screening individual applicants for a credit card account at a point of sale.

Prudent consumers are taking advantage of widespread incentives offered by retail establishments that are aggressively competing with the new shopping medium known as the Internet. Popular new marketing initiatives are being created such as preferred customer programs whereby customer loyalty cards are issued offering discounts based upon the number and value of purchases made as well as providing points redeemable for merchandise. Wholesale clubs are popping up in many regions whereby registered members with 'club' cards or membership cards receive the benefits of reduced prices for items including those purchased in bulk quantities. Many of these businesses now offer private label credit cards to customers in order to encourage repeat business. Holders of these cards often receive special mailings including coupons for special items, announcements of private or preferred customer sales, and other incentives.

Applying for a private label credit card in the store or a commercial credit card (e.g., VISA®, Mastercard®, American Express®) can be time consuming and inconvenient for today's hurried shoppers. A special trip to the customer service desk and filling out various credit forms are two of the general requirements preceding the establishment of an account. If approved for credit in the store, the customer must then transport selected items for purchase to a check out register, waiting in line for perhaps a second time.

What is needed is a more efficient process whereby the pre-approval of credit worthy consumers, the generation of a credit offer to these consumers, and the offer acceptance by the consumers occur at a single location and can be translated into immediate purchasing power in a matter of seconds.

SUMMARY OF INVENTION

An exemplary embodiment of the invention relates to a method, system and storage medium for pre-screening customers for a credit card at a point of sale. The method includes receiving the customer data at a point of sale system and, during a check out process: transmitting the customer data to a server; searching a database for the customer data; and based upon results of the searching, performing a credit worthiness check and providing said customer with an invitation to open a charge account. If the customer accepts the invitation, a charge account is opened before a payment method is selected whereby the customer can place the items selected for purchase on the new charge account while at the point of sale system. The system includes at least one point of sale system coupled to a communications link; a server coupled to the point of sale system via the communications link; a data storage device in communication with the server; and a link to a credit information server.

DETAILED DESCRIPTION

An exemplary embodiment of the invention allows entities to instantly pre-screen customers for a pre-approved private label credit card (PLCC) or bank card based on customer information contained within a private database or contained in a customer card such as a smart card. The credit pre-screen process takes place while the customer is at a check out system at the end of a shopping endeavor. The term, "pre-approval" refers to a credit industry term that means that the customer has passed preliminary credit-information screening. The terms, "charge account" and "credit account" are used interchangeably throughout this description. The credit pre-screen/pre-approval process is seamless to the customer, automatic for the selling entity, and provides a response time that is in seconds thereby reducing the effort and inconvenience associated with previous credit approval systems.

Customers in a retail store present a customer card or key identifying information at the time of check out prior to the retail store associate scanning and/or handling the selected items. As described above, a customer card may be a membership card or customer loyalty card issued by the selling entity that stores general information relating to the customer. The customer's card is scanned or key identification information is entered about the customer, and information is sent to a central server for processing and then to a credit card supplier's backend credit scoring system to be pre-screened. Key identification information may include an ID, a telephone number, social security number, account number, customer name, etc. If the customer gets approved, the credit card supplier presents the customer with an approval document stating that the customer has been pre-approved for the private label credit card or bankcard, along with the terms and conditions of the offer, and invites the customer to open a charge account with the selling entity. If the customer accepts, he/she is asked whether they would like to place the purchase on the card and may receive a discount off of their first order. The marketing information can be customized, but the concept will be the same. If the customer agrees, the associate will ask the customer for secondary personal identification in order to activate the account (if needed).

Figure 1:
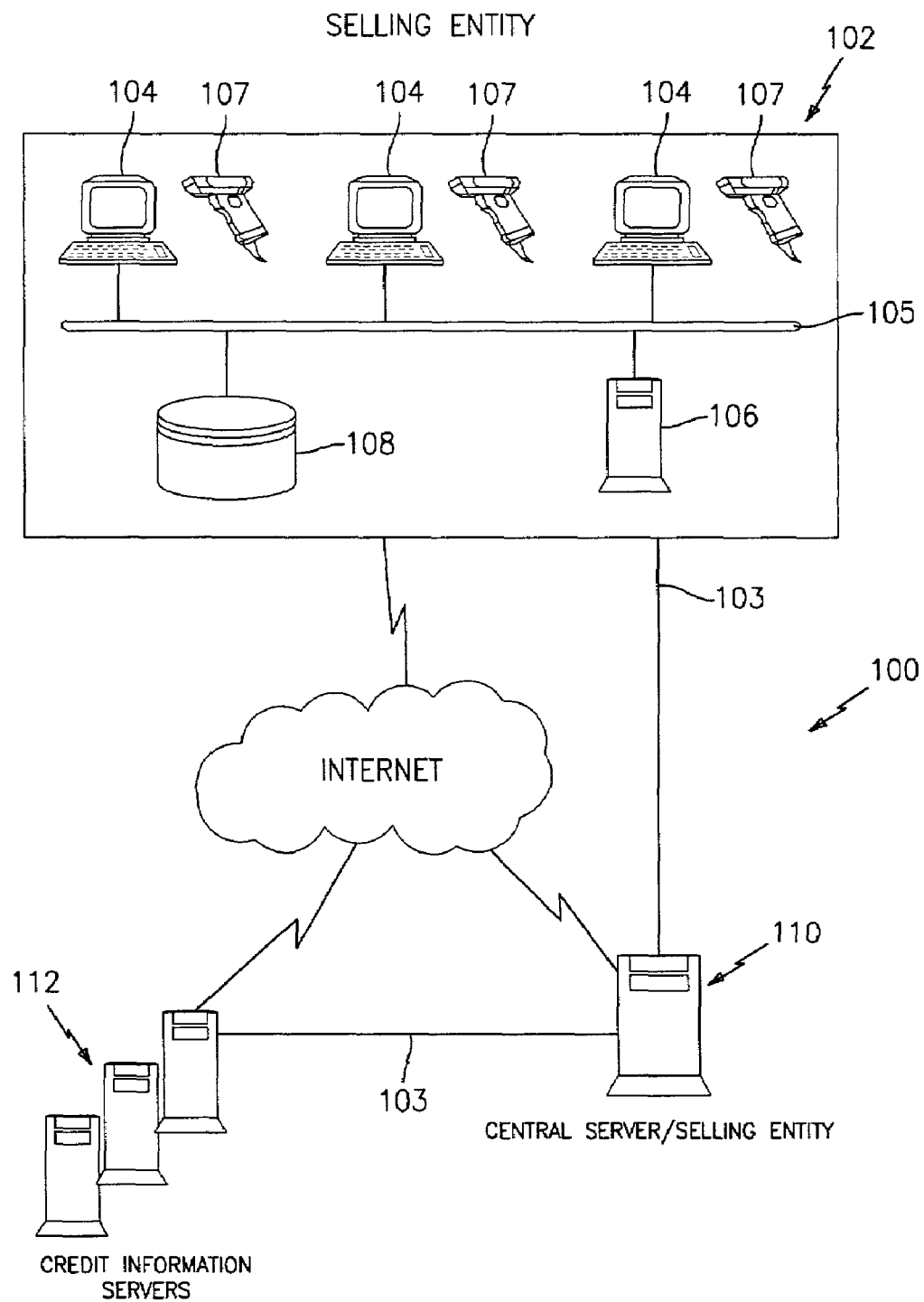
FIG. 1 illustrates a system diagram upon which the credit services tool is implemented in a preferred embodiment.

FIG. 1 illustrates a network system 100 upon which the credit approval tool is implemented. Network system 100 includes a selling entity 102, comprising a number of POS devices 104 each of which is connected to a communications link 105. Selling entity 102 may be a retail store and may be one of many such stores belonging to a retail chain. POS devices 104 may be computerized electronic cash registers and are generally known in the art. POS devices 104 may also include a customer service system for issuing customer cards, credit cards, maintaining customer accounts, and providing related services. Scanning devices 107 are connected to POS devices 104 and are used for scanning merchandize and customer cards as described herein. Scanning devices 107 may be universal product code (UPC) reading devices, magnetic strip reading devices, or other electronic device. Server 106 is also connected to communications link 105 and is capable of accessing external entities via a dedicated line 103 or, alternatively, via an internetwork system such as the Internet or an Extranet. Data storage device 108 is also included in selling entity 102 and houses customers' personal account records, credit account data, and other information desired by selling entity 102. External entities outside of selling entity 102 include central server 110 and credit information system 112 which are accessible to selling entity 102 via dedicated lines 103 or an internetwork system such as the Internet. Central server 110 may be an external credit-granting corporate or central facility of the retail chain to which selling entity 102 belongs. Central server 110 stores a master database of client tables pertaining to credit-enabled customers or those who have valid customer accounts with the retail chain associated with selling entity 102. Alternatively, central server 110 may be maintained by a commercial software services provider, or ASP, which provides these types of services for the retail chain for a fee. Credit information servers 112 may be national credit reporting agencies which collect various credit activities of individuals and maintain a database of these activities for the purpose of assisting lenders in determining an individual's credit worthiness prior to approval of a loan, mortgage, or other credit transaction. Such entities are well known in the art and include Trans Union LLC, Experian, and Equifax.

Figure 2:
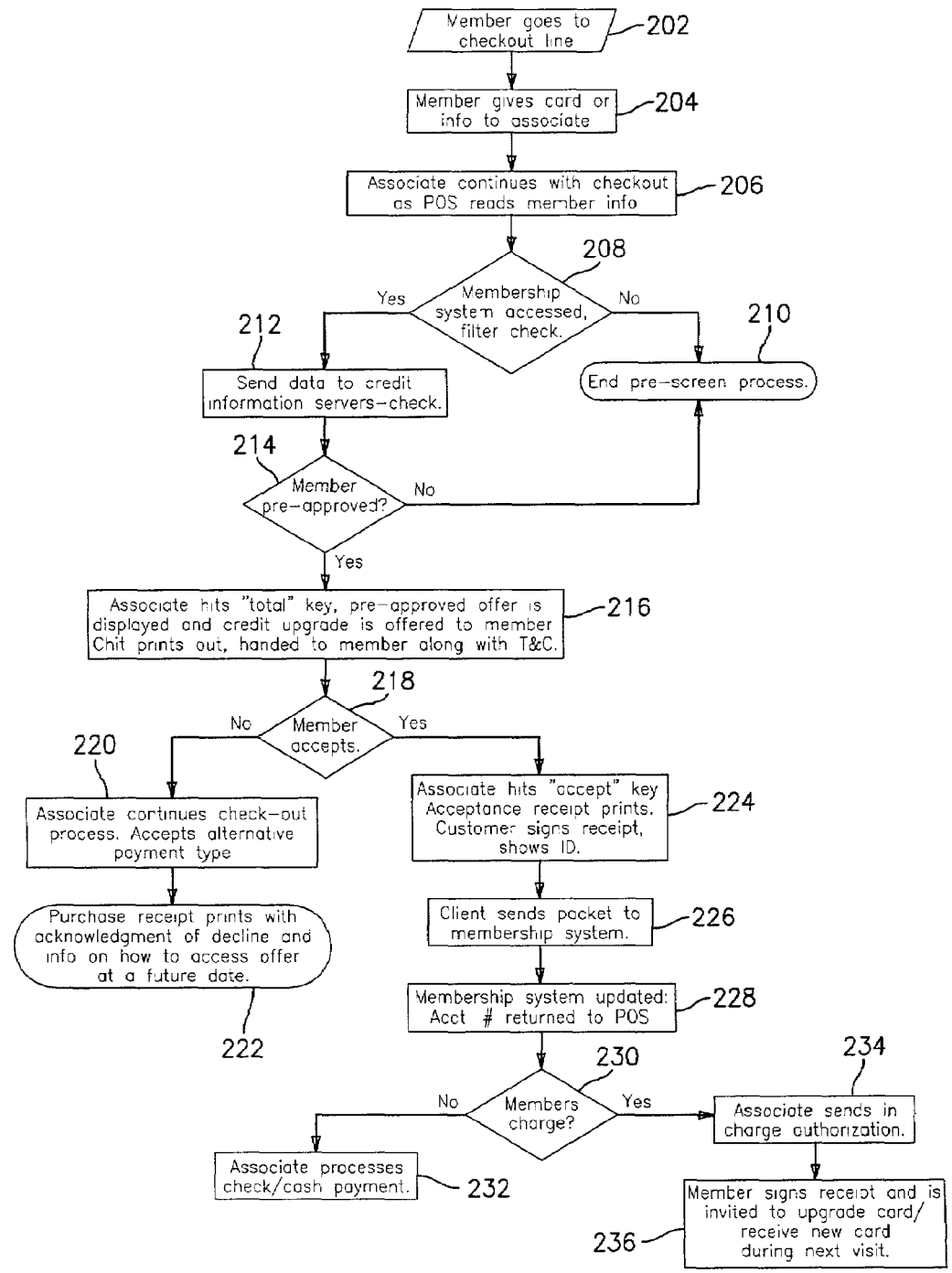
FIG. 2 is a flow chart describing the credit screening and approval process in an exemplary embodiment.

FIG. 2 describes the credit pre-approval process implemented by the credit services tool of the invention. A customer at selling entity 102 proceeds to a check out station (also referred to as POS system) 104 with selected items for purchase at step 202. The customer presents a customer card or identification information to a sales associate at check out station 104 at step 204. The sales associate scans the customer card via a scanning device, other card-reading device, or enters the information and then proceeds to scan the selected goods at step 206. During the check out process, the data obtained by the sales associate is transmitted to server 106 and/or central server 110 for processing at step 208. In a large retail store system environment, it may be preferable to transfer the credit services tool functions to a central server such as server 110 in order to accommodate high volume data storage requirements and faster transaction processing speeds. For smaller retail chains, server 106 may execute the credit services tool whereby customer accounts can be stored and accessed locally. For purposes of illustration, server 110 is handling the execution and coordination of the credit services tool functions.

Server 110 and/or data storage device 108 searches for the customer's record, matching the data from the customer card with a customer table which houses information about the customer, such as customer name, address, the frequency of offers presented to this customer, etc. Server 110 and/or data storage device 108 also assesses whether the customer has an existing credit account, whether that account is active and/or valid, as well as other eligibility criteria. For example, an invalid customer account may be one in which a one-year term membership has expired. Server 110 also determines whether the customer has an existing credit card account with selling entity 102. If the customer has a credit card account with selling entity 102, no further action is required. The customer will pay for the product using the existing credit card or other payment means using well-known techniques. If there has been a previous offer made to the customer or the customer was previously declined within a predetermined time frame, the process ends at step 210.

If the customer does not have a credit card account with selling entity 102 but is an active/valid member server 110, and/or data storage device 108 via server 110, sends the customer data to credit information servers 112 at step 212 to determine if the customer meets pre-determined criteria. Each determination uses well-known scoring techniques by a credit bureau to determine the credit worthiness of the customer based upon information supplied. Using this information, and other risk criteria, the credit services tool determines whether the customer is pre-approved at step 214. The credit services tool may also establish a credit limit, APR, and account type for the account at this time. If customer does not pass the criteria, no further activity occurs in the screening process and the process ends at step 210.

For pre-approved customers, the associate hits the total key and the pre-approval offer is displayed, printed out, and presented to the customer at step 216. The offer may be printed out at the check out location utilizing existing cash register receipt instruments or suitable computer printing devices. The offer includes any terms and conditions of the offer as required by law. The credit services tool presents the opportunity to accept or decline the offer and the related terms and conditions. If the customer fails to get a pre-approved offer at the point of sale location at the time the offer is processed, an offer may be made via a follow-up mailing.

The above steps 208-214 are transparent to the customer and the activities described therein take place during the check out process. It will be understood that the checkout process referred to herein may take place in a variety of commercial settings such as a registration desk or bridal/gift registry, etc. As such, the pre-approval process may occur at these locations as well. The pre-approval process is preferably completed prior to the time in which the customer selects a payment method.

The customer is asked if he/she wants to accept the pre-approved credit card offer and may be provided an incentive to do so by the offering of certain promotional incentives such as a discount off the purchase price or a reduced interest rate for a limited time at step 218. If the customer declines the offer, flow proceeds to step 220 whereby the associate continues with the check out process, accepting alternative payment means. A purchase receipt is printed with acknowledgment of the decline and information on how to access the offer at a future date if the customer changes his/her mind at step 222. The data relating to the declination of the offer is transmitted via the check out station 104 to server 110 and a record is kept by selling entity 102. If the customer returns to the location at a later date, the credit services tool will determine the length of time since the last credit check. Based on the length of time that has elapsed since the customer's last visit, the credit services tool may perform a new credit worthiness determination as described above. These time fields may be customized via the credit services tool as desired.

If the customer accepts the offer including its terms and conditions, he/she may be asked to present a second form of identification to ensure that the customer is in fact the person identified in the account on record. If the identification does not match the record information, the associate may direct the customer to a service desk to resolve the conflict or may be instructed that he/she will receive further communication by mail. In this instance, no further action towards the issuance of a credit card is continued and the process reverts to step 220.

If the identification information matches the customer record information, the associate hits the 'accept' key, and an acceptance receipt prints out. The customer signs the receipt at step 224. POS 104 sends the completed packet of information to server 110 at step 226. The system is updated to create the new account and an account number is assigned to the package and returned to selling entity 102 and check out station 104 at step 228.

The customer is then asked if he/she would like to charge the current purchase using this new account at step 230. If not, the associate processes the payment according to accepted transaction methods at step 232. If the customer accepts the charge payment for the transaction, the associate sends in the charge authorization to server 110 whereby the charge transaction is processed and the system updated at step 234. The customer is given a receipt of the purchase and signs the receipt at step 236. The customer may be provided with a credit card at this time or the credit card may be provided at a later date.

The present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention.

The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the present invention has been described in terms of specific embodiments, it should be understood that these embodiments are illustrative and should not be taken as limiting. The scope of the invention should be limited only in accordance with the following claims.

The invention claimed is:

1. A method for pre-screening customer data of a customer by a selling entity at a point of sale location, comprising:
   receiving said customer data at a point of sale system; and
   during the course of a single check out process at said point of sale location:
      transmitting said customer data to a server;
      searching a database for said customer data;
      performing a credit worthiness check to determine a credit pre-approval of said customer, said performing is done using a result of said searching and without knowledge of and uninitiated by said customer;
      providing said customer with an invitation to open a charge account, wherein said providing of said invitation comprises offering said customer an incentive to accept said invitation through at least one of a discount for a purchase and a reduced interest rate;
      opening said charge account upon acceptance of said invitation by said customer; and
      selectively executing a charge purchase during said check out process at said point of sale system using said opened charge account.

2. The method of claim 1, further comprising:
   holding said invitation open for a predetermined period of time; and
   providing said customer with information on how to access said invitation at a future date.

3. The method of claim 2, wherein said providing said customer information on how to access said invitation at a future date includes printing said information on a receipt at said point of sale system.

4. The method of claim 1, wherein said customer data includes at least one of said customer's:
   name;
   address;
   telephone number;
   social security number;
   photo identification card; and
   membership card relating to said selling entity.

5. The method of claim 1, further comprising determining whether a membership status of said customer is active or inactive; wherein further said credit worthiness check is performed on customer data with an active status.

6. The method of claim 1, further comprising determining whether said customer has a current charge account with said selling entity.

7. The method of claim 1, wherein said credit worthiness check is performed by a credit bureau.

8. The method of claim 1, wherein said credit worthiness check is performed by a credit issuer.

9. The method of claim 1, wherein said credit worthiness check is a full bureau check.

10. The method of claim 1, wherein said credit worthiness check is a partial bureau check.

11. The method of claim 1, wherein said performing a credit worthiness check comprises determining at least one of a credit account limit, an annual percentage rate, and an account type, for customers who have met specified criteria for said credit pre-approval determination.

12. The method of claim 1, further comprising printing out said invitation and providing a term or a condition of said invitation.

13. The method of claim 1, wherein data related to a declination of said invitation is transmitted to said server, and a customer record relating to said data is updated.

14. The method of claim 1, further comprising providing said customer with a charge card.

15. The method of claim 1, further comprising performing a fraud check, said fraud check including verifying said customer's identity.

16. A storage medium encoded with machine-readable computer program code for pre-screening customer data by a selling entity for a customer at a point of sale location, the storage medium including instructions for causing the selling entity to implement a method comprising:
   receiving said customer data at a point of sale system; and
   during the course of a single check out process at said point of sale location:
      transmitting said customer data to a server;
      searching a database for said customer data;
      performing a credit worthiness check to determine a credit pre-approval of said customer, said performing is done using a result of said searching and without knowledge of and uninitiated by said customer;
      providing said customer with an invitation to open a charge account, wherein said providing of said invitation to comprises offering said customer an incentive to accept said invitation through at least one of a discount off of a purchase and a reduced interest rate;
      opening said charge account, upon acceptance of said invitation by said customer; and
      selectively executing a charge purchase during said check out process at said point of sale system.

17. The storage medium of claim 16, further comprising:
   holding said invitation open for a predetermined period of time; and
   providing said customer with information on how to access said invitation at a future date.

18. The storage medium of claim 17, wherein said providing said customer information on how to access said invitation at a future date includes printing said information on a receipt at said point of sale system.

19. The storage medium of claim 16, wherein said customer data includes at least one of said customer's:
   name;
   address;

telephone number;
social security number;
photo identification card; and
membership card relating to said selling entity.

20. The storage medium of claim 16, further comprising determining whether a membership status of said customer is active or inactive; wherein further said credit worthiness check is performed on customer data with an active status.

21. The storage medium of claim 16, further comprising determining whether said customer has a current charge account with said selling entity.

22. The storage medium of claim 16, wherein said credit worthiness check is performed by a credit bureau.

23. The storage medium of claim 16, wherein said credit worthiness check is performed by a credit issuer.

24. The storage medium of claim 16, wherein said credit worthiness check is a full bureau check.

25. The storage medium of claim 16, wherein said credit worthiness check is a partial bureau check.

26. The storage medium of claim 16, wherein said performing a credit worthiness check comprises determining at least one of a credit account limit, an annual percentage rate, and an account type for customers who have met specified criteria for said credit pre-approval determination.

27. The storage medium of claim 16, further comprising printing out said invitation and providing a term or a condition of said invitation.

28. The storage medium of claim 16, wherein data related to a declination of said invitation is transmitted to said server and a customer record relating to said data is updated.

29. The storage medium of claim 16, further comprising providing said customer with a charge card.

30. The storage medium of claim 16, further comprising performing a fraud check, said fraud check including verifying said customer's identity.

* * * * *